(12) United States Patent
Chang et al.

(10) Patent No.: US 9,562,552 B2
(45) Date of Patent: Feb. 7, 2017

(54) LIGHT HOLDING APPARATUS FOR PROJECTOR

(71) Applicant: BENQ Corporation, Taipei (TW)

(72) Inventors: Chia-Ling Chang, Taipei (TW); Chian-Yu Yeh, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 14/955,089

(22) Filed: Dec. 1, 2015

(65) Prior Publication Data
US 2016/0154295 A1    Jun. 2, 2016

(30) Foreign Application Priority Data

Dec. 2, 2014    (TW) .............................. 103141817 A (51) Int. Cl.
| | |
|---|---|
| F21S 8/00 | (2006.01) |
| F16B 7/14 | (2006.01) |
| G06F 3/042 | (2006.01) |
| F16M 13/02 | (2006.01) |
| G03B 21/26 | (2006.01) |
| F16M 11/04 | (2006.01) |
| F16M 11/18 | (2006.01) |
| F16M 11/24 | (2006.01) |
| G03B 21/14 | (2006.01) |

(52) U.S. Cl.
CPC ............ *F16B 7/1472* (2013.01); *F16M 11/048* (2013.01); *F16M 11/18* (2013.01); *F16M 11/24* (2013.01); *F16M 13/02* (2013.01); *G03B 21/26* (2013.01); *G06F 3/0421* (2013.01); *G03B 21/145* (2013.01)

(58) Field of Classification Search
CPC .......... F16B 7/1472; F16B 7/10; F16M 13/02; G03B 21/2046; G03B 21/2033; G06F 3/0421
USPC ............................... 248/274.1; 362/418, 382
See application file for complete search history.

(56) References Cited

U.S. PATENT DOCUMENTS

2011/0090410 A1*    4/2011    Ye ........................ F16M 11/105
                                                                  348/836

FOREIGN PATENT DOCUMENTS

TW                20143366 A         4/2014

OTHER PUBLICATIONS

Office action of counterpart application by Taiwan IP Office on Jun. 3, 2016.

* cited by examiner

*Primary Examiner* — Todd M Epps (57) ABSTRACT

A holding apparatus for a projector includes a frame, a connection body, a telescopic device, and a bracket. The frame is fixed to a surface. One end of the connection body is connected to the frame. The telescopic device is fixed to the other end of the connection body opposite to the frame along an extending direction of the connection body. The telescopic device includes a moving unit movable along a first direction perpendicular to the extending direction of the connection body. The moving unit is connected to a detecting module. The bracket has a first end connected to the frame and a second end for connecting the projector. The second end is disposed opposite to the surface and extends along the first direction.

10 Claims, 7 Drawing Sheets

LIGHT HOLDING APPARATUS FOR PROJECTOR

BACKGROUND OF THE INVENTION

1. Field of the Invention

The present invention relates to a holding apparatus; in particular, the present invention relates to a holding apparatus for a projector that can adjust the position of a laser source according to the disposing surface.

2. Description of the Prior Art

Projection device has the advantage of outputting large size image. With the technical development of the image quality, projectors have been widely used in conference rooms, exhibitions, or classrooms. There are some products combining the projector with a laser touch module for users to write directly on the projection image. Specifically, the technology uses a laser touch module generating laser beams to form a laser screen which covers the projection image. When an object touches the projection image, the laser beams will be reflected. The lens of the projector will identify the relative position to achieve the direct writing operation.

However, the present products combining projectors with the laser touch module require the laser touch module directly installed on a wall or at an inner side of a border of a white board. After deducting safety distance of the laser touch module, the laser screen cannot match the projection image. In other words, writing actions cannot be sensed at some locations on the projection image resulted from the configuration of the traditional laser touch module. When users write on the projection image, the writing actions may not be identified. As such, the present products combining projectors with the laser touch module need to be improved.

SUMMARY OF THE INVENTION

One object of the present invention is to provide a holding apparatus for a projector that can adjust the position of a laser source according to the output image and the disposing surface.

The holding apparatus for a projector includes a frame, a connection body, a telescopic device, and a bracket. The frame is fixed to a surface. One end of the connection body is connected to the frame. The telescopic device is fixed to the other end of the connection body opposite to the frame along an extending direction of the connection body. The telescopic device includes a moving unit movable along a first direction perpendicular to the extending direction of the connection body. The moving unit is connected to a detecting module. The bracket has a first end connected to the frame and a second end for connecting the projector. The second end is disposed opposite to the surface and extends along the first direction.

DETAILED DESCRIPTION OF THE PREFERRED EMBODIMENT

A holding apparatus of the present invention is utilized to adjust the position of a laser source on a disposing surface, so that the range of the laser screen can match the projection image according to the projection size.

Figure 1:
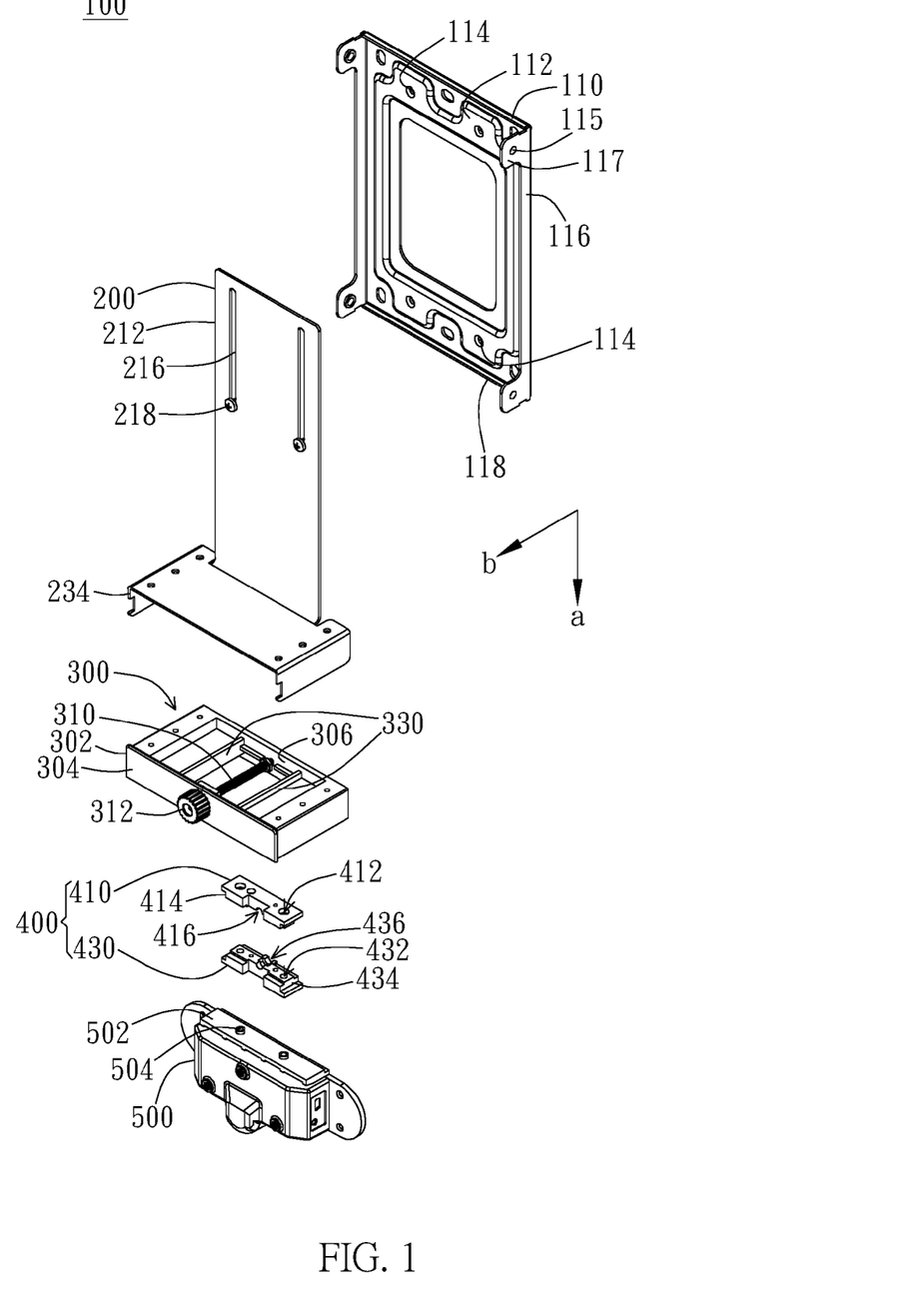
FIG. 1 is an exploded view of an embodiment of a holding apparatus for a projector of the present invention.

FIG. 1 is an exploded view of an embodiment of the holding apparatus 100 of the present invention. As shown in FIG. 1, the holding apparatus 100 includes a frame 110, a connection body 200, a telescopic device 300, a moving unit 400, and a detecting module 500. The frame 110 is installed on a surface, such as a surface for disposing a projector. Specifically, the frame 110 has a back plate 112, and two sides of the back plate 112 are respectively connected to a side plate 116, which extends along an extending direction (a) of the connection body 200. A plurality of first holes 114 is formed on the back plate 112, and the first holes 114 are provided for the connection body 200 to be combined with the frame 110. Ledges 117 are formed on two ends of the side plate 116 along the extending direction (a). As shown in FIG. 1, ledges 117 protrude from the side plate 116 (i.e. extends away from the back plate 112) along a first direction (b) which is perpendicular to the extending direction (a). A second hole 115 is formed on each of the ledges 117, and the second hole 115 is provided for a bracket to be combined with the frame 110 (please refer to FIG. 6A and FIG. 6B).

One end of the connection body 200 is secured to the frame 110. Specifically, the connection body 200 includes a first movable end 212 and a first stationary end 234. An elongated hole 216 and a locking unit 218 are formed on the first movable end 212. The first stationary end 234 protrudes from a bottom edge 118 of the frame 110 along the extending direction (a) of the connection body 200. It is appreciated that the length between the first movable end 212 and the first stationary end 234 is longer than the length between the first holes 114 and the bottom edge 118 of the frame 110, so that the first stationary end 234 can protrude from the bottom edge 118. As shown in FIG. 1, the elongated hole 216 is formed on a surface of the connection body 200 along the extending direction (a) of the connection body 200. The locking unit 218 is inserted into the first hole 114 via the elongated hole 216 to fix the connection body 200 on the frame 110. Therefore, when the locking unit 218 is engaged with the first hole 114 at different positions of the elongated hole 216, the connection body 200 can be adjusted to have different positions (such as different height) relative to the frame 110 along the extending direction (a). Besides, the first stationary end 234 is connected to the telescopic device 300.

As shown in FIG. 1, the telescopic device 300 is fixed to the other end (i.e. the first stationary end 234) of the connection body 200 and opposite to the frame 110 along the extending direction (a) of the connection body 200. The telescopic device 300 includes a fixing unit 310 which is formed to extend away from the frame 110 along the first direction (b) perpendicular to the extending direction (a). Specifically, one end of the fixing unit 310 is fixed to a front plate 302 of the telescopic device 300 and combined with a knob 312 on an outer surface 304 of the front plate 302. The other end of the fixing unit 310 is fixed to an inner surface 306 of the telescopic device 300. Therefore, the knob 312 is capable of driving the fixing unit 310 to rotate. Besides, the telescopic device 300 further includes a positioning plate 330. As shown in FIG. 1, a pair of positioning plates 330 is arranged at two sides of the fixing unit 310. The pair of positioning plates 330 is formed along the first direction (b) to limit the movement of a moving unit relative to the frame 110 along the first direction (b).

As shown in FIG. 1, a pair of moving units 400 are arranged to clamp the fixing unit 310. In detail, the moving units 400 include a first moving unit 410 and a second moving unit 430. The first moving unit 410 has a recessed portion 416 at its center, wherein the recessed portion 416 has a shape matching the outline of the fixing unit 310. Retreated portions 414, which retreat from periphery of the first moving unit 410 toward the recessed portion 416, are formed at two sides of the first moving unit 410. The shape of the retreated portion 414 matches that of the positioning plate 330, so that the retreated portion 414 serve as a contact surface where the moving unit 400 is attached to the positioning plate 330. Besides, the first moving unit 410 has a through hole 412 formed along the extending direction (a). The first moving unit 410 can be fixed to the second moving unit 430 by the through hole 412. Similarly, the second moving unit 430 has a recessed portion 436, retreated portions 434, and a through hole 432 corresponding to the recessed portion 416, retreated portions 414, and the through hole 412, respectively. As shown in FIG. 1, the second moving unit 430 has the recessed portion 436 at its center. The recessed portion 416 and the recessed portion 436 together form a through hole allowing the fixing unit 310 to pass through the moving unit 400 along the first direction (b). Retreated portions 434 can, as mentioned above, serve as a contact surface where the moving unit 400 is attached to the positioning plate 330, i.e. each of the first moving unit 410 and the second moving unit 430 has retreated portions formed at two sides to clamp the positioning plate 330 across the first direction (b). The location of the through hole 432 corresponds to the location of the through hole 412 to fix the first moving unit 410 and the second moving unit 430. As shown in FIG. 1, the detecting module 500 has a fixing element 504 for combining the detecting module 500 and the moving unit 400; as such, the pair of the moving units 400 is connected to a top surface 502 of the detecting module 500. In an embodiment, the detecting module 500 preferably adopts a laser module, but is not limited to. By this design, the detecting module 500 can be connected to the moving unit 400 and locates at a side of the telescopic device 300 opposite to the connection body 200.

Figure 2A:
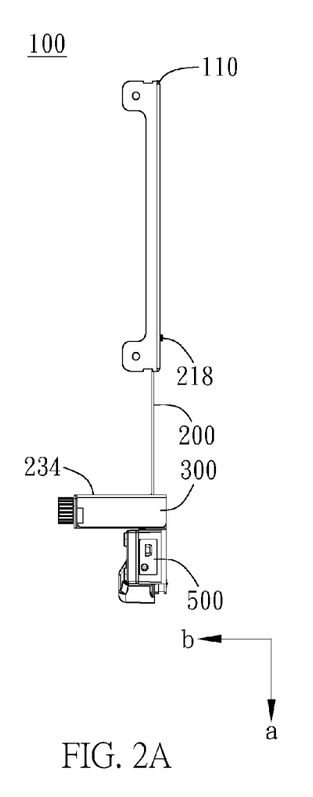
FIGS. 2A-2C are side views of an embodiment of the holding apparatus in different using status.
Figure 2B:
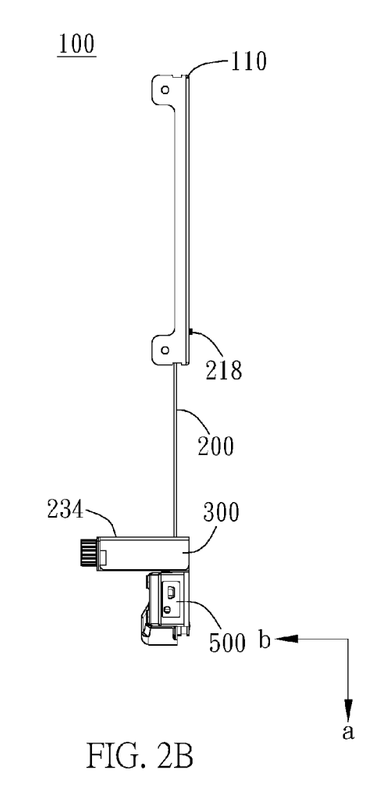
Figure 2C:
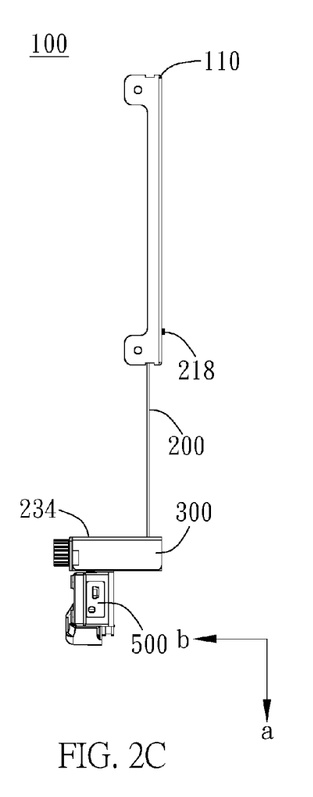
Figure 3A:
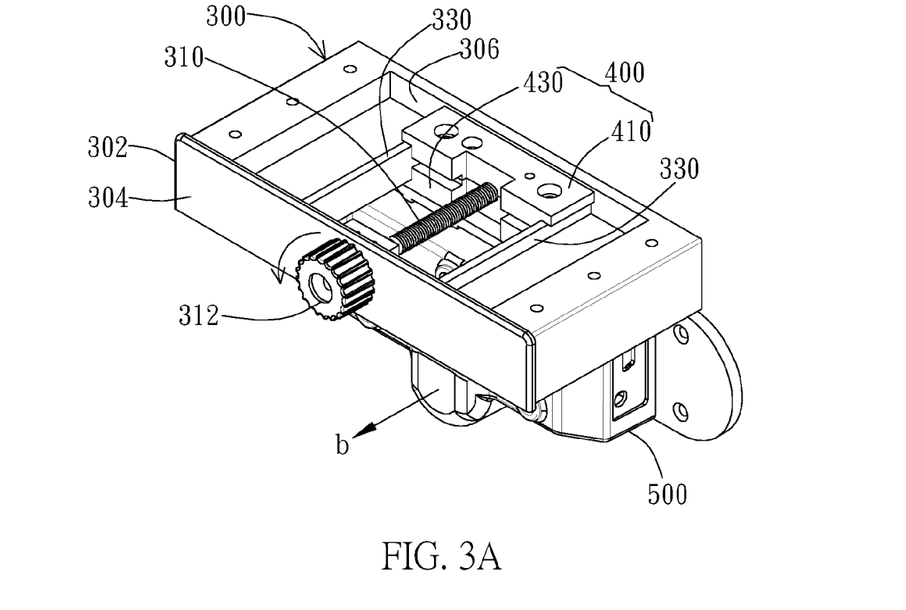
FIGS. 3A and 3B are perspective views of actuations of a telescopic device.
Figure 3B:
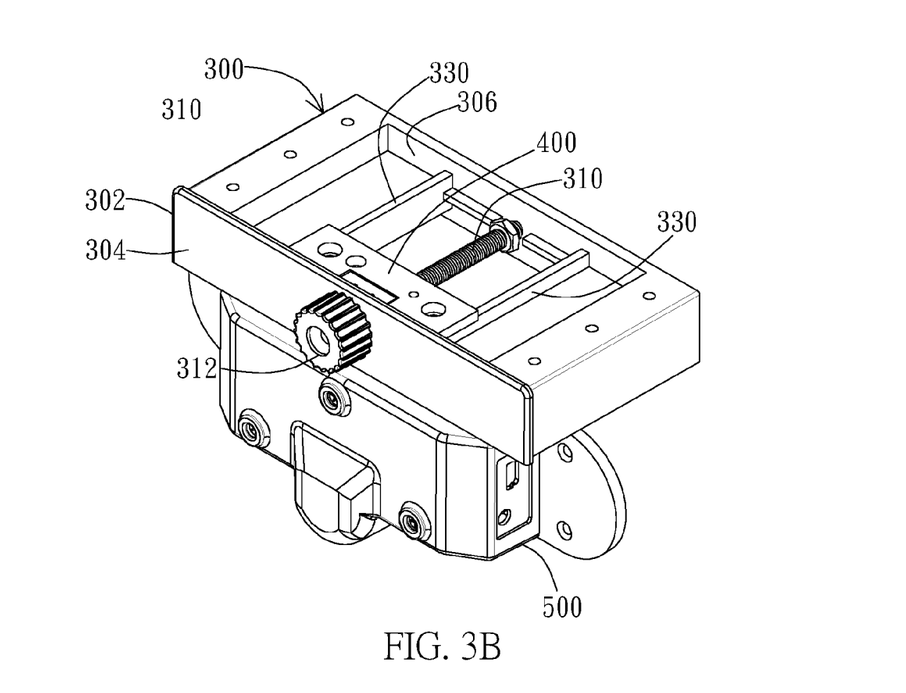

FIGS. 2A-2C are side views of an embodiment of the holding apparatus 100 in different using status. As shown in FIG. 2A and FIG. 2B, the connection body 200 can be adjusted at different height. As shown in FIG. 2B and FIG. 2C, the detecting module 500 can be adjusted at different position along the first direction (b) (for example, moving forward or backward along the first direction (b)). The mechanism of driving the detecting module 500 by the telescopic device 300 can refer to FIG. 3A and FIG. 3B. FIGS. 3A and 3B are perspective views of actuation of the telescopic device 300. As shown in FIG. 3A, the detecting module 500 is connected to the fixing unit 310 by means of the moving unit 400. Two sides of the first fixing unit 410 and the second fixing unit 430 clamp the positioning plate 330. When the knob 312 on the outer surface 304 of the front plate 302 is turned, the fixing unit 310 is turned correspondingly. After turning the knob 312 in counterclockwise direction, as shown in FIG. 3B, the moving unit 400 moves toward the front plate 302 along the first direction (b) and drives the detecting module 500 moving toward the front plate 302. In this embodiment, the fixing unit 310 is a screw rod serving as a rail for moving the moving unit 400. The positioning plates 330 at two sides serve as a guide rail for providing steady movement to the moving unit 400.

Figure 4:
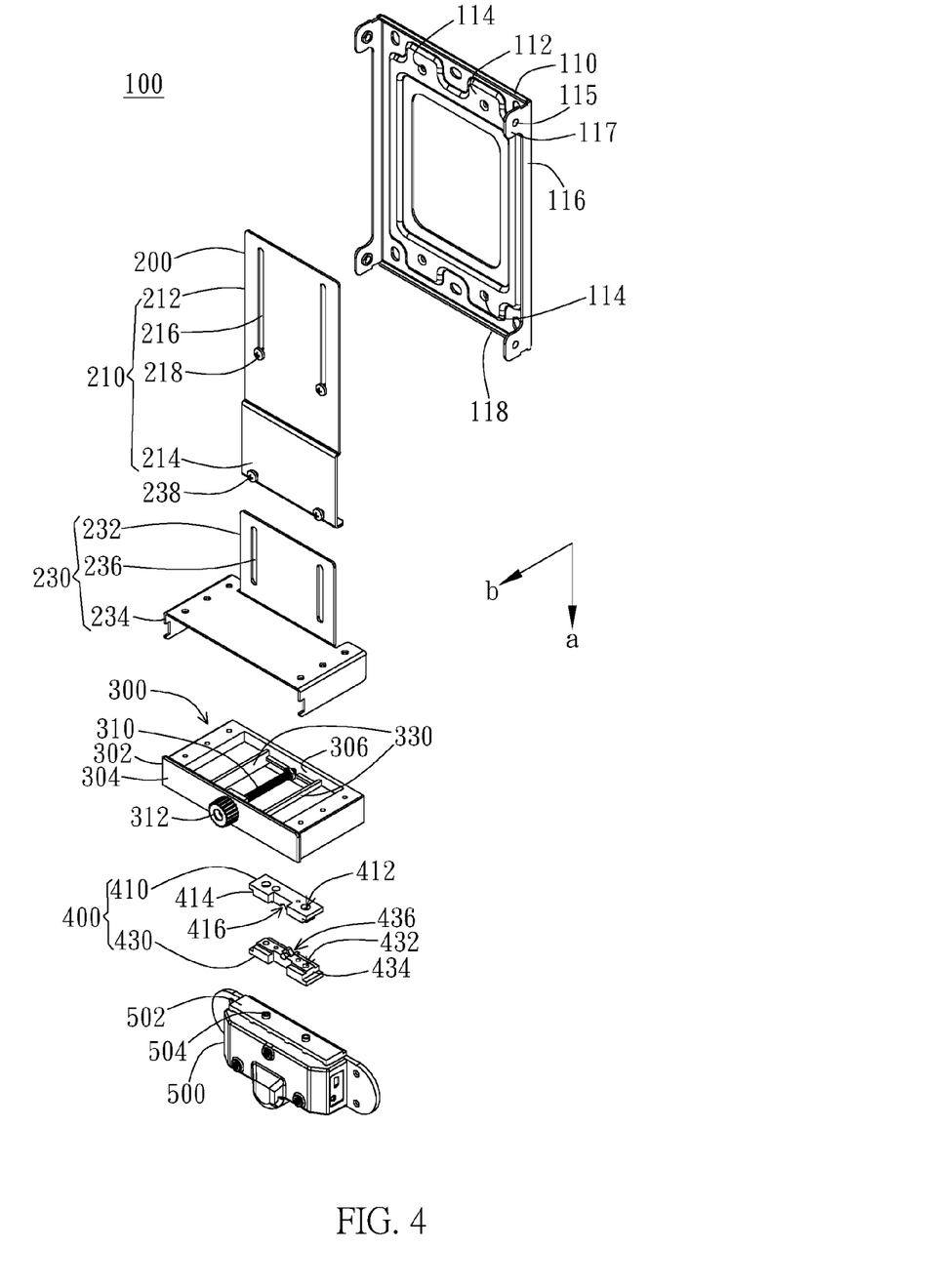
FIG. 4 is a schematic view of another embodiment of a holding apparatus for a projector of the present invention.

FIG. 4 is a schematic view of another embodiment of the holding apparatus 100 of the present invention. The difference between the holding apparatus 100 shown in FIG. 4 and in the foregoing embodiment is that the connection body includes two connecting sections to provide different extent of distance adjustment. As shown in FIG. 4, the connection body 200 includes a first connecting section 210 and a second connecting section 230. The first connecting section 210 has a first movable end 212 and a second stationary end 214 disposed at a side opposite to the first movable end 212. As mentioned above, the first movable end 212 has the elongated hole 216 formed along the extending direction (a) of the connection body 200 and fixed on the frame 110 by the locking unit 218 via the elongated hole 216.

The second connecting section 230 is disposed between the first connecting section 210 and the telescopic device 300. As shown in FIG. 4, the second connecting section 230 includes a first stationary end 234 and a second movable end 232 disposed at a side opposite to the first stationary end 234. As mentioned above, the first stationary end 234 protrudes from the bottom edge 118 of the frame 110 along the extending direction (a) and is connected to the telescopic device 300. The second movable end 232 is slidably attached to the second stationary end 214. Similarly, the second stationary end 232 has an elongated hole 236 formed along the extending direction (a) of the connection body 200. The second movable end 232 is combined with the first connecting section 210 by the locking unit 238 via the elongated hole 236. In this embodiment, the elongated hole 236 and the elongated hole 216 are designed to have different extent of length, but is not limited to. Elongated holes with different extending lengths can serve as coarse adjustment and fine adjustment to determine the position of the connection body 200 relative to the position of the frame 110. For example, the extending length of the elongated hole 216 at the first movable end 212 is longer than the extending length of the elongated hole 236 at the second movable end 232; thus, at the first movable end 212, the length of the connection body 200 protruding from the bottom edge 118 can be adjusted generally by the locking unit 218. Then, the length of the connection body 200 protruding from the bottom edge 118 can be adjusted finely by the locking unit 238 at the second movable end 232.

Figure 5A:
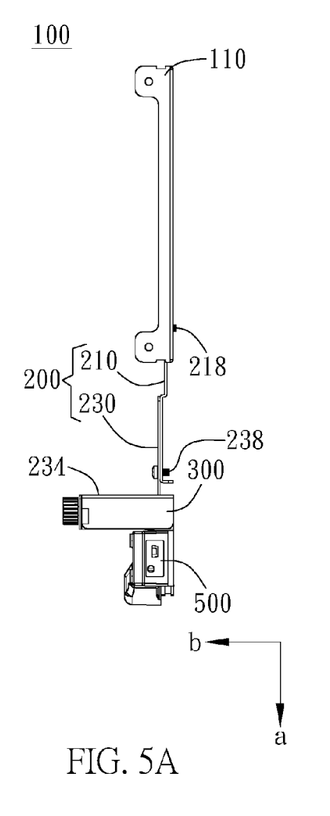
FIGS. 5A-5C are side views of an embodiment of the holding apparatus in different using status.
Figure 5B:
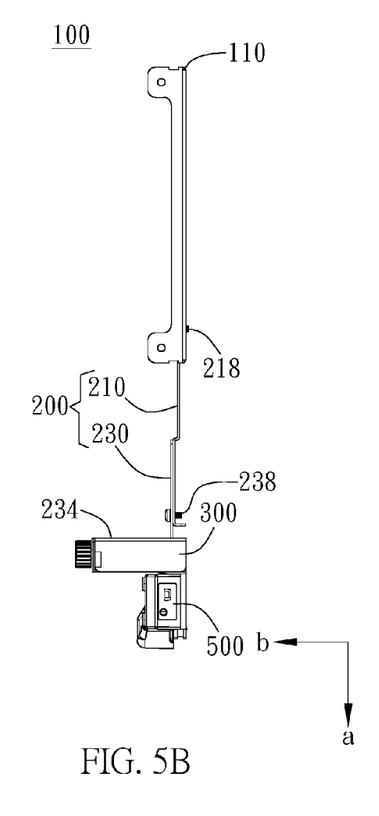
Figure 5C:
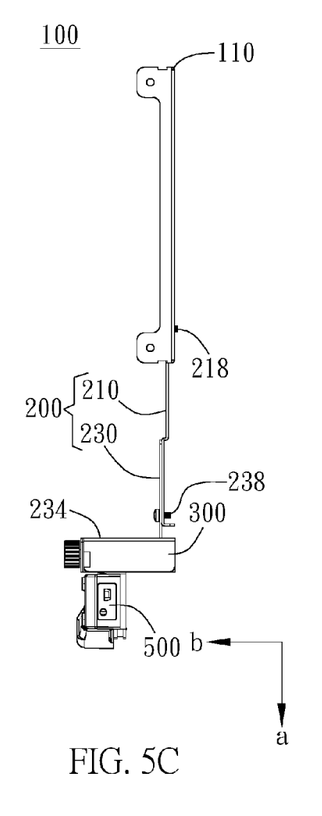

FIGS. 5A-5C are side views of an embodiment of the holding apparatus 100 in different using status. As shown in FIG. 5A and FIG. 5B, the connection body 200 can, at first, be adjusted to different height by utilizing the locking unit 218. If there is still a slight height difference between the required position and the adjusted position shown in FIG. 5B after the connection body is moved downward, the locking unit 238 can be utilized to perform fine adjustment. As shown in FIG. 5B and FIG. 5C, the detecting module 500 can be adjusted at different positions along the first direction (b) (such as moving forward or backward) by the telescopic device 300. The actuation of the telescopic device 300 has been mentioned above and does not elaborate herein.

Figure 6A:
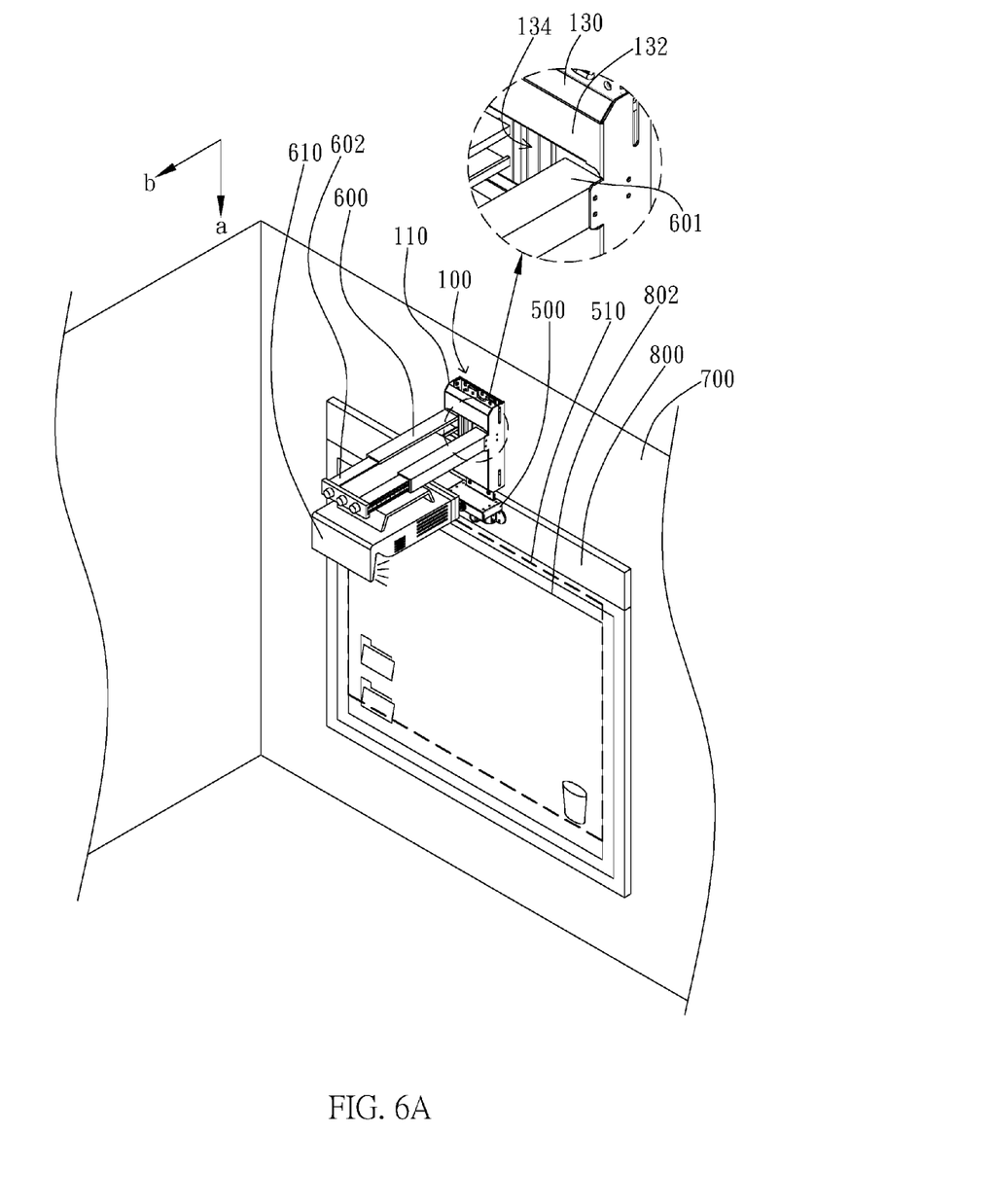
FIGS. 6A and 6B are schematic views of adjusting process of a laser screen generated from the holding apparatus of the present invention.
Figure 6B:
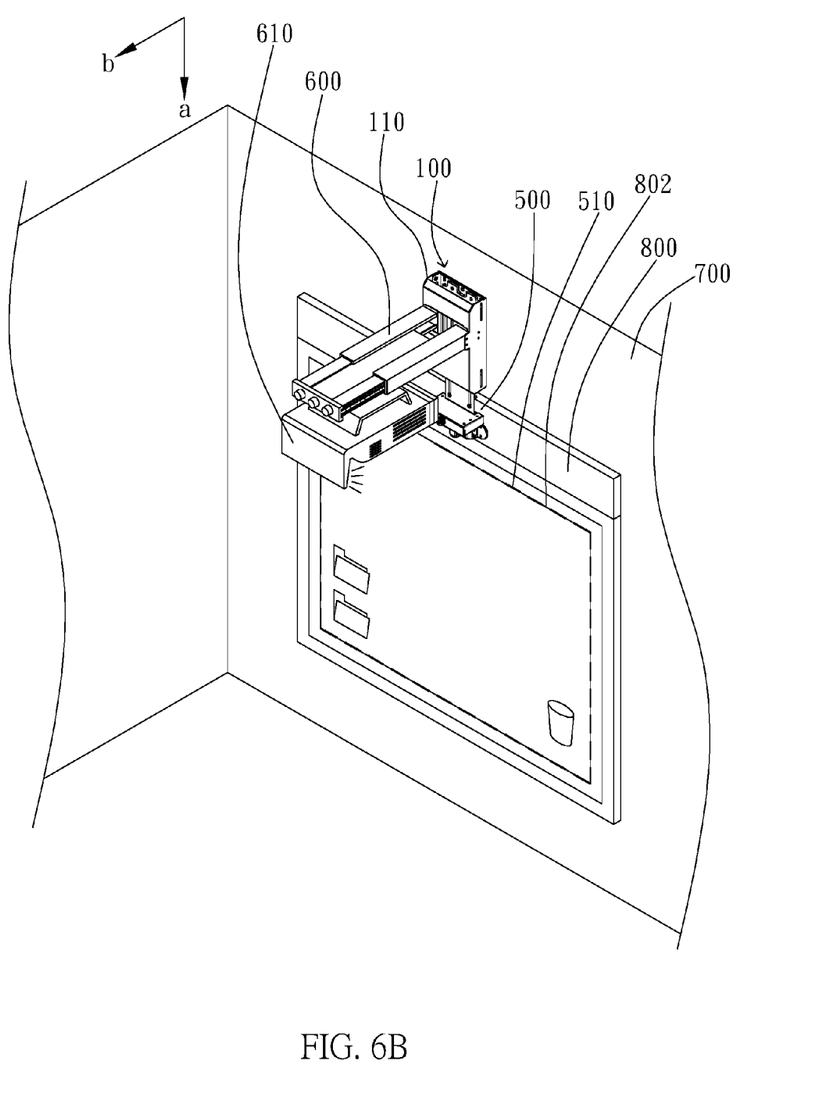

FIGS. 6A and 6B are schematic views of adjusting process of a laser screen generated from the holding apparatus 100 of the present invention. As shown in FIG. 6A, at first, the frame 110 is installed on the surface 700 (e.g. wall surface, ceiling surface) in a distance away from a white board 800. The holding apparatus 100 includes a front frame 130 disposed on a surface of the connection body 200 opposite to the frame 110. As shown in an enlarged view of the front frame 130, the front frame 130 is combined with the frame 110, and an opening 134 is formed on an outer surface 132 of the front frame 130. The bracket 600 is disposed corresponding to the opening 134 and connected to the front frame 130. Specifically, the bracket 600 has a first end 601 and a second end 602 located opposite to the surface 700 along the first direction (b). The first end 601 of the bracket 600 is connected to the frame 110 and the second end 602 is connected to the projector 610. Besides, the bracket 600 is retractable along the first direction (b) to drive the projector 610 approaching to or departing from the surface 700; therefore, the size and the position of the projection image can be adjusted. As shown in FIG. 6A, the projector 610 produces a projection image on the white board 800 and has a projection range 802 (shown in solid line). The detecting module 500 produces a laser screen on the white board 800 and has a laser screen range 510 (shown in broken line). As shown in FIG. 6A, the laser screen range 510 does not match the projection range 802. As shown in FIG. 6B, the detecting module 500 is adjusted approaching to the white board 800 according to adjusting method mentioned above, so that the laser screen range 510 can match the projection range 802, and the positioning of the laser screen range 510 and the projection range 802 is completed.

By this design, users can utilize the connection body to achieved different stages of adjustment according to the projection image. In addition, users can utilize the holding apparatus of the present invention to adjust the relative position of the laser module and the white board without being limited by the border of the white board that will generate uneven sensing effect in traditional technique.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A holding apparatus for holding a projector and a detecting module on a surface, the holding apparatus comprising:
   a frame to be fixed on the surface;
   a connection body, one end of the connection body being connected to the frame;
   a telescopic device fixed to another end of the connection body and opposite to the frame along an extending direction of the connection body, the telescopic device comprising a moving unit movable along a first direction perpendicular to the extending direction of the connection body, the moving unit being connected to the detecting module; and
   a bracket having a first end connected to the frame and a second end for connecting the projector, the second end disposed opposite to the surface and extending along the first direction.

2. The holding apparatus of claim 1, wherein the connection body comprises:
   a first movable end having at least one elongated hole formed along the extending direction of the connection body;
   a locking unit fixed on the frame via the elongated hole; and
   a first stationary end protruding from a bottom edge of the frame along the extending direction of the connection body and being connected to the telescopic device.

3. The holding apparatus of claim 1, wherein the connection body comprises:
   a first connecting section comprising a first movable end and a second stationary end disposed at a side opposite to the first movable end, the first movable end having at least one elongated hole formed along the extending direction of the connection body and fixed on the frame by a locking unit via the elongated hole; and
   a second connecting section disposed between the first connecting section and the telescopic device, the second connecting section comprising a first stationary end and a second movable end disposed at a side opposite to the first stationary end, the second movable end slidably attached to the second stationary end, the first stationary end protruding from a bottom edge of the frame along the extending direction of the connection body and being connected to the telescopic device.

4. The holding apparatus of claim 1, wherein the detecting module is located at a side of the telescopic device opposite to the connection body.

5. The holding apparatus of claim 1, further comprising a fixing unit formed to extend away from the frame along the first direction.

6. The holding apparatus of claim 5, wherein the holding apparatus comprises a pair of the moving units to clamp the fixing unit, the pair of moving units are connected to a top surface of the detecting module.

7. The holding apparatus of claim 5, further comprising a pair of positioning plates arranged at two sides of the fixing unit inside the telescopic device, wherein the pair of positioning plates are formed as a sliding rail along the first direction to limit a movement of the moving unit along the first direction.

8. The holding apparatus of claim 5, wherein the fixing unit is a screw rod, when the fixing unit is turned to drive the moving unit to move along the first direction away from the frame, the detecting module moves together with the moving unit along the first direction.

9. The holding apparatus of claim 1, further comprising a front frame disposed on a surface of the connection body opposite to the frame, wherein the front frame is combined with the frame and has an opening formed on an outer surface of the front frame; the bracket is disposed corresponding to the opening and connected to the front frame.

10. The holding apparatus of claim 1, wherein the bracket is retractable along the first direction to drive the projector approaching to or departing from the surface.

* * * * *